(12) United States Patent
Mizunashi et al.

(10) Patent No.: US 12,420,468 B2
(45) Date of Patent: Sep. 23, 2025

(54) CONTROLLER OF INJECTION MOLDING MACHINE, INJECTION MOLDING MACHINE, AND RECORDING MEDIUM

(71) Applicant: SUMITOMO HEAVY INDUSTRIES, LTD., Tokyo (JP)

(72) Inventors: Takuya Mizunashi, Chiba (JP); Takasue Yamaguchi, Chiba (JP); Daigo Hotta, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 542 days.

(21) Appl. No.: 17/818,779

(22) Filed: Aug. 10, 2022

(65) Prior Publication Data

US 2023/0053669 A1 Feb. 23, 2023

(30) Foreign Application Priority Data

Aug. 18, 2021 (JP) ................................. 2021-133488

(51) Int. Cl.
 *B29C 45/76* (2006.01)

(52) U.S. Cl.
 CPC .... *B29C 45/762* (2013.01); *B29C 2045/7606* (2013.01); *B29C 2945/7607* (2013.01); *B29C 2945/76163* (2013.01); *B29C 2945/76381* (2013.01)

(58) Field of Classification Search
 CPC .......... B29C 45/762; B29C 2045/7606; B29C 2945/7607; B29C 2945/76163; B29C 2945/76381
 See application file for complete search history.

(56) References Cited

U.S. PATENT DOCUMENTS

| | | | |
|---|---|---|---|
| 4,674,053 A | 6/1987 | Bannai et al. | |
| 5,817,258 A * | 10/1998 | Ito | B29C 45/77 425/149 |
| 2002/0032500 A1* | 3/2002 | Sasaki | B29C 45/76 700/203 |
| 2003/0082255 A1 | 5/2003 | Konishi et al. | |
| 2012/0217668 A1* | 8/2012 | Catoen | B29C 45/78 264/40.3 |
| 2015/0140148 A1 | 5/2015 | Komiya | |
| 2017/0193965 A1* | 7/2017 | Karsten | G06F 3/04886 |
| 2017/0282423 A1* | 10/2017 | Murata | B29C 45/7653 |

FOREIGN PATENT DOCUMENTS

| | | |
|---|---|---|
| JP | S59-158237 | 9/1984 |
| JP | S62-218119 | 9/1987 |
| JP | H10-024475 | 1/1998 |
| JP | 2003-200456 | 7/2003 |
| JP | 2004-155125 | 6/2004 |
| JP | 2004-299134 | 10/2004 |
| JP | 2015-96298 | 5/2015 |
| JP | 2015-142977 | 8/2015 |

\* cited by examiner

*Primary Examiner* — Charles Cai
(74) *Attorney, Agent, or Firm* — IPUSA, PLLC

(57) ABSTRACT

A controller of an injection molding machine includes a detection part configured to detect whether or not a process in each process performed in the injection molding machine has started based on preset conditions in the process, and an output part configured to output waveform information representing a change of a performance value detected in the process or a subsequent process that is subsequent to the process when the detection part detects that the process has started.

8 Claims, 7 Drawing Sheets

CONTROLLER OF INJECTION MOLDING MACHINE, INJECTION MOLDING MACHINE, AND RECORDING MEDIUM

CROSS-REFERENCE TO RELATED APPLICATIONS

The present application is based on and claims priority to Patent Application No. 2021-133488 filed on Aug. 18, 2021 with the Japan Patent Office, and the entire contents of Japanese Patent Application No. 2021-133488 are hereby incorporated by reference.

BACKGROUND OF THE INVENTION

1. Field of the Invention

The present invention relates to a controller of an injection molding machine, an injection molding machine, and a storage medium.

2. Description of the Related Art

Conventionally, various sensors are provided in an injection molding machine. Therefore, in an injection molding machine, there has been proposed a technique for displaying waveform data in which various processes during injection molding based on a detection signal from a sensor or the setting information by a user are represented by a waveform on a display.

In recent years, various techniques have been proposed for displaying waveform data on a display of an injection molding machine. For example, conventionally, a technique for simultaneously displaying waveform data in two regions has been proposed.

SUMMARY

A controller of an injection molding machine includes a detection part configured to detect whether or not a process in each process performed in the injection molding machine has started based on preset conditions in the process, and an output part configured to output waveform information representing a change of a performance value detected in the process or a subsequent process that is subsequent to the process when the detection part detects that the process has started.

DETAILED DESCRIPTION OF THE INVENTION

Figure 1:
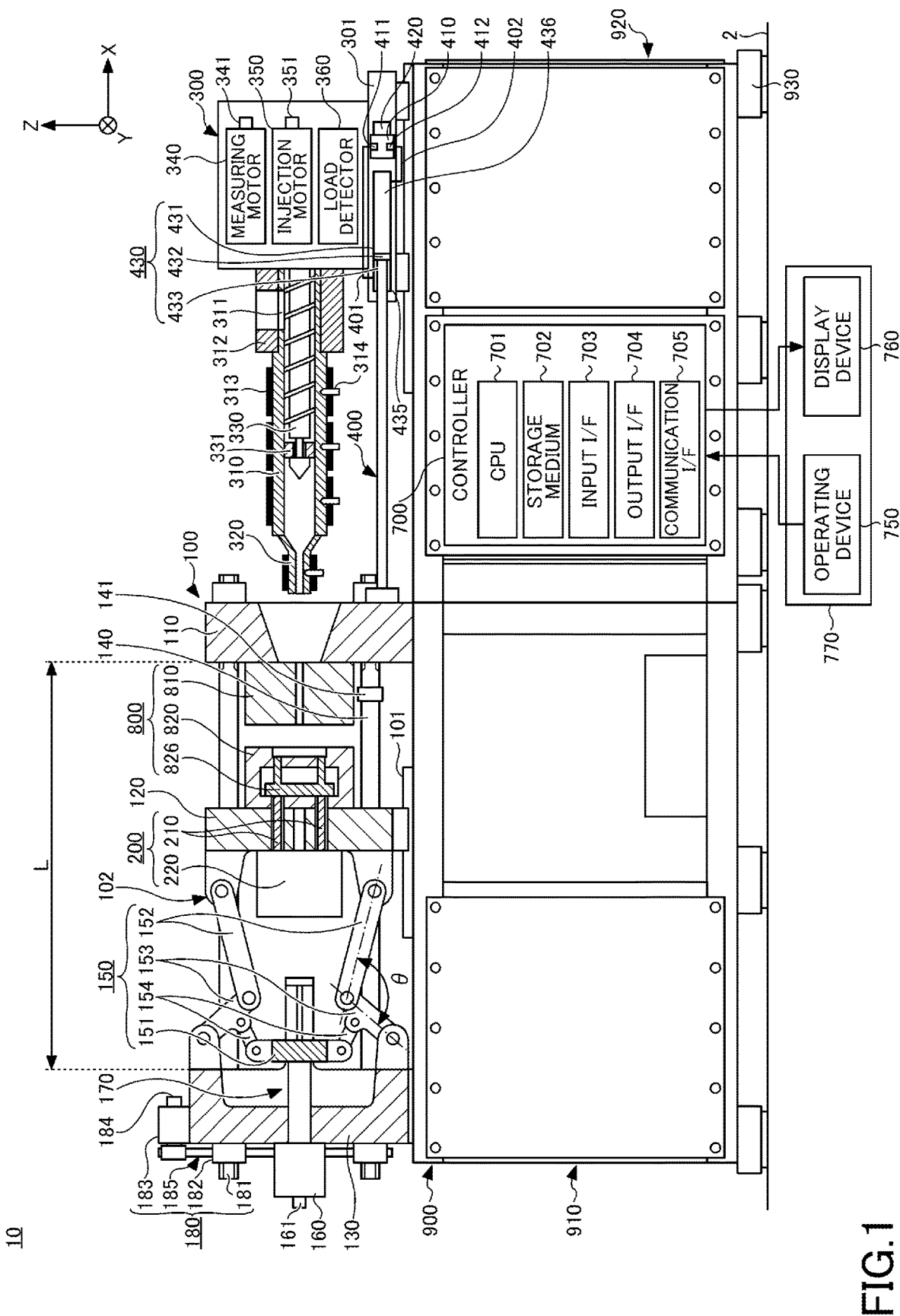
FIG. 1 illustrates a state of an injection molding machine according to a first embodiment when opening of a mold is completed.

In conventional technique, timing for starting the display of waveforms is triggered by changes in a sensor output. However, the changes in the sensor output often do not correspond to the changes of processes in injection molding machines, and it is desirable to start displaying waveforms at more suitable timings.

One aspect of the present invention provides a technique that enables appropriate quality control by outputting waveform information indicating a performance value detected in a process at the timing when the process is switched, thereby making it possible to properly ascertain the process performed in the process.

According to one embodiment of the present invention, it is possible to properly ascertain the process performed in the process, thereby achieving appropriate quality control.

Hereinafter, an embodiment of the invention will be described with reference to drawings. In each drawing, the same or corresponding reference numerals are assigned to the same or corresponding configurations, and descriptions thereof are omitted.

Figure 2:
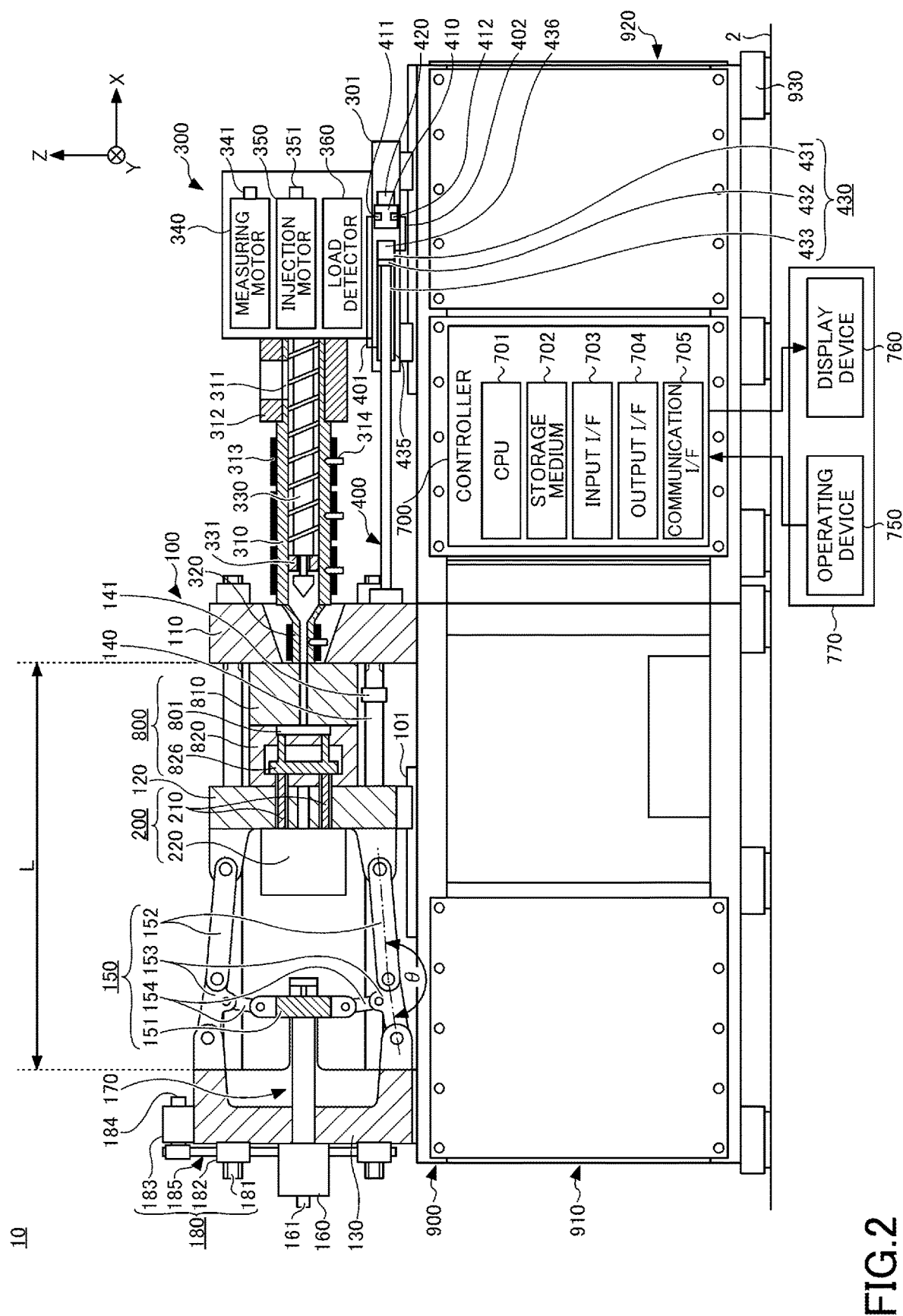
FIG. 2 illustrates a state of the injection molding machine according to the first embodiment when the mold is clamped.

FIG. 1 is a view illustrating a state when a mold opening of an injection molding machine according to an embodiment is completed. FIG. 2 is a view illustrating a state when a mold of the injection molding machine according to the embodiment is clamped. In this specification, an X-axis direction, a Y-axis direction, and a Z-axis direction are directions perpendicular to each other. The X-axis direction and the Y-axis direction represent a horizontal direction, and the Z-axis direction represents a vertical direction. When a mold clamping device 100 is a horizontal type, the X-axis direction is a mold opening and closing direction and the Y-axis direction is a width direction of an injection molding machine 10. A negative side in the Y-axis direction is referred to as an operation side, and a positive side in the Y-axis direction is referred to as a non-operation side.

As illustrated in FIGS. 1 and 2, the injection molding machine 10 includes a mold clamping device 100 that opens and closes a mold device 800, an ejector device 200 that ejects a molded article molded by the mold device 800, an injection device 300 that injects a molding material into the mold device 800, a moving device 400 that moves the injection device 300 forward and backward against the mold device 800, a controller 700 that controls each component of the injection molding machine 10, and a frame 900 that supports each component of the injection molding machine 10. The frame 900 includes a mold clamping device frame 910 supporting the mold clamping device 100 and an injection device frame 920 supporting the injection device 300. The mold clamping device frame 910 and the injection device frame 920 are respectively installed on the floor 2 via a leveling adjuster 930. The controller 700 is placed in the internal space of the injector device frame 920. Each component of the injection molding machine 10 is described below.

(Mold Clamping Device)

In descriptions of the mold clamping device 100, a movement direction (for example, X-axis positive direction) of a movable platen 120 at the time of mold closing is defined as a front side, and a movement direction (for example, X-axis negative direction) of the movable platen 120 at the time of mold opening is defined as a rear side.

The mold clamping device 100 performs mold closing, pressure-boosting, mold clamping, depressurizing, and mold opening of a mold device 800. The mold device 800 includes a fixed mold 810 and a movable mold 820. The mold clamping device 100 is horizontal, for example, and the mold opening and closing direction is horizontal. The mold clamping device 100 has a fixed platen 110 to which a fixed mold 810 is attached, the movable platen 120 to which the movable mold 820 is attached, and a moving mechanism 102 for moving the movable platen 120 in the mold opening and closing direction relative to the fixed platen 110.

The fixed platen 110 is fixed to the mold clamping device frame 910. The fixed mold 810 is attached to the surface of the fixed platen 110 facing the movable platen 120.

The movable platen 120 is freely arranged in the mold opening and closing direction with respect to the mold clamping device frame 910. On the mold clamping device frame 910, a guide 101 is laid to guide the movable platen 120. The movable mold 820 is attached to the surface of the movable platen 120 facing the fixed platen 110.

The moving mechanism 102 moves the movable platen 120 forward and backward against the fixed platen 110 to close, pressure-boost, clamp, depressurize, and open the mold device 800. The moving mechanism 102 has a toggle support 130 spaced apart from the fixed platen 110, a tie bar 140 connecting the fixed platen 110 and the toggle support 130, a toggle mechanism 150 for moving the movable platen 120 in the mold opening and closing direction with respect to the toggle support 130, a mold clamping motor 160 for operating the toggle mechanism 150, a motion conversion mechanism 170 for converting the rotational motion of the mold clamping motor 160 into linear motion, and a mold thickness adjustment mechanism 180 for adjusting the spacing between the fixed platen 110 and the toggle support 130.

The toggle support 130 is spaced from the fixed platen 110 and mounted on the mold clamping device frame 910 so as to move freely in the mold opening and closing direction. The toggle support 130 may be movably arranged along a guide laid on the mold clamping device frame 910. The guide of the toggle support 130 may be the same as the guide 101 of the movable platen 120.

In the present embodiment, the fixed platen 110 is fixed to the mold clamping device frame 910 and the toggle support 130 is arranged freely in the mold opening and closing direction with respect to the mold clamping device frame 910, but the toggle support 130 may be fixed to the mold clamping device frame 910 and the fixed platen 110 may be arranged freely in the mold opening and closing direction with respect to the mold clamping device frame 910.

The tie bar 140 connects the fixed platen 110 and the toggle support 130 with an interval L in the mold opening and closing direction. Multiple tie bars 140 (for example, 4) may be used. The multiple tie bars 140 are arranged parallel to the mold opening and closing direction and extend according to the clamp force. At least one tie bar 140 may be provided with a tie bar strain detector 141 that detects strain in the tie bar 140. The tie bar strain detector 141 sends a signal indicating its detection result to the controller 700. The detection result of the tie bar strain detector 141 is used for the detection of clamp force or the like.

In the present embodiment, the tie bar strain detector 141 is used as the mold clamping force detector for detecting the clamp force, but the present invention is not limited to this. The clamping force detector is not limited to the strain gauge type, but may be piezoelectric, capacitive, hydraulic, electromagnetic, or the like, and its mounting position is not limited to the tie bar 140.

A toggle mechanism 150 is positioned between the movable platen 120 and the toggle support 130 to move the movable platen 120 relative to the toggle support 130 in the mold opening and closing direction. The toggle mechanism 150 has a crosshead 151 that moves in the mold opening and closing direction and a pair of link groups that bend and stretch by the movement of the crosshead 151. The pair of link groups have, respectively, a first link 152 and a second link 153 flexibly connected by pins or the like. The first link 152 is swingably attached to the movable platen 120 by a pin or the like. The second link 153 is swingably attached to the toggle support 130 by a pin or the like. The second link 153 is attached to the crosshead 151 via the third link 154. When the crosshead 151 is moved forward and backward against the toggle support 130, the first link 152 and the second link 153 are bent and stretched, and the movable platen 120 moves forward and backward against the toggle support 130.

The configuration of the toggle mechanism 150 is not limited to the configuration illustrated in FIGS. 1 and 2. For example, in FIGS. 1 and 2, the number of nodes in each link group is 5, but it may be 4, and one end of the third link 154 may be connected to the nodes of the first link 152 and the second link 153.

A mold clamping motor 160 is attached to the toggle support 130 to operate the toggle mechanism 150. The mold clamping motor 160 bends and stretches the first link 152 and the second link 153 by moving the crosshead 151 forward and backward against the toggle support 130, and moves the movable platen 120 forward and backward against the toggle support 130. The mold clamping motor 160 is directly connected to the motion conversion mechanism 170, but may be connected to the motion conversion mechanism 170 via a belt, pulley, and the like.

The motion conversion mechanism 170 converts the rotational motion of the mold clamping motor 160 into the linear motion of the crosshead 151. The motion conversion mechanism 170 includes a screw shaft and a screw nut that screws into the screw shaft. A ball or roller may be interposed between the screw shaft and the screw nut.

The mold clamping device 100 performs a mold closing process, a pressure-boosting process, a mold clamping process, a depressurizing process, a mold opening process, and the like under the control of the controller 700.

In the mold closing process, the mold clamping motor 160 is driven to move the crosshead 151 forward to the mold closing completion position at a set moving velocity, thereby forwarding the movable platen 120 and touching the movable mold 820 to the fixed mold 810. The position and moving velocity of the crosshead 151 are detected using, for example, a mold clamping motor encoder 161. The mold clamping motor encoder 161 detects the rotation of the mold clamping motor 160 and sends a signal indicating the result of the detection to the controller 700.

The crosshead position detector for detecting the position of the crosshead 151 and the crosshead moving velocity detector for detecting the moving velocity of the crosshead 151 are not limited to the mold clamping motor encoder 161, but general position detectors can be used. The movable platen position detector for detecting the position of the movable platen 120 and the movable platen moving velocity detector for detecting the moving velocity of the movable platen 120 are not limited to the mold clamping motor encoder 161, and general velocity detectors can be used.

In the pressure-boosting process, the mold clamping force is generated by further driving the mold clamping motor 160 to further move the crosshead 151 forward from the mold closing clamping position to the mold open clamping position.

In the mold clamping process, the mold clamping motor 160 is driven to maintain the position of the crosshead 151 in the mold clamping position. In the mold clamping process, the mold clamping force generated in the pressure-boosting process is maintained. In the mold clamping process, a cavity space 801 (see FIG. 2) is formed between the movable mold 820 and the fixed mold 810, and an injection device 300 fills the cavity space 801 with a liquid molding material. The filled molding material is solidified, resulting in a molded product.

The number of cavity spaces 801 may be one or more. In the latter case, multiple molded products are obtained simultaneously. The insert material may be placed in a portion of the cavity space 801 and the molding material may be filled in another portion of the cavity space 801. The insert material and the molding material are integrated into a molded product.

In the depressurization process, the mold clamping motor 160 is driven to move the crosshead 151 backward from the mold closing clamping position to the mold opening starting position, thereby moving the movable platen 120 backward and reducing the mold clamping force. The mold opening start position and the mold closing completion position may be the same position.

In the mold opening process, the mold clamping motor 160 is driven to move the crosshead 151 backward from the mold opening start position to the mold opening completion position at a set moving velocity, thereby moving the movable platen 120 backward and separating the movable mold 820 from the fixed mold 810. An ejector device 200 then ejects the molded product from the movable mold 820.

The setting conditions in the mold closing, pressure-boosting, and clamping processes are collectively set as a series of setting conditions. For example, the moving velocity and position (includes mold closing starting position, moving velocity switching position, mold closing completion position, and mold clamping closing position) of the crosshead 151 and the mold clamping force in the mold closing and pressure-boosting processes are collectively set as a series of setting conditions. The mold closing starting position, the moving velocity switching position, the mold closing completion position, and the mold clamping position are arranged in this order from the rear side to the front side and represent the start and end points of the section where the moving velocity is set. For each section, a moving velocity is set. The moving velocity switching position may be one or more. The moving velocity switching position need not be set. Only one of the mold clamping position and the mold clamping force may be set.

Setting conditions in the depressurization process and mold opening process are similarly set. For example, the moving velocity and position (mold opening start position, moving velocity switching position, and mold opening completion position) of the crosshead 151 in the depressurization and mold opening processes are collectively set as a series of setting conditions. The mold opening start position, the moving velocity switching position, and the mold opening completion position are arranged in this order from the front to the rear and represent the start and end points of the section where the moving velocity is set. For each section, a moving velocity is set. The moving velocity switching position may be one or more. The moving velocity switching position need not be set. The mold opening start position and the mold closing completion position may be at the same position. The mold opening completion position and the mold closing start position may be the same.

The moving velocity and position of the movable platen 120 may be set instead of the moving velocity and position of the crosshead 151. The mold clamping force may also be set instead of the position of the crosshead (for example, mold clamping position) or the position of the movable platen.

The toggle mechanism 150 amplifies the driving force of the mold clamping motor 160 and transmits the force to the movable platen 120. That amplification factor is also called toggle magnification. The toggle magnification varies according to the angle θ (hereinafter also referred to as "link angle θ") formed by the first link 152 and the second link 153. The link angle θ is obtained from the position of the crosshead 151. The toggle magnification is maximum when the link angle θ is 180 degrees.

When the thickness of the mold device 800 changes due to the replacement of the mold device 800 or a change in the temperature of the mold device 800, the mold thickness is adjusted so that a prescribed clamping force is obtained when the mold is clamped. In mold thickness adjustment, the interval L between the fixed platen 110 and the toggle support 130 is adjusted so that the link angle θ of the toggle mechanism 150 becomes a predetermined angle at the time of mold touch, for example, when the movable mold 820 touches the fixed mold 810.

The mold clamping device 100 has a mold thickness adjustment mechanism 180. The mold thickness adjustment mechanism 180 adjusts the interval L between the fixed platen 110 and the toggle support 130 to adjust the mold thickness. The timing of the mold thickness adjustment is performed, for example, between the end of the molding cycle and the start of the next molding cycle. The mold thickness adjustment mechanism 180 has, for example, a screw shaft 181 formed at the rear end of the tie bar 140, a screw nut 182 held rotatably and non-movably in the forward and backward direction by the toggle support 130, and a mold thickness adjustment motor 183 for rotating the screw nut 182 screwed to the screw shaft 181.

The screw shaft 181 and the screw nut 182 are provided for each tie bar 140. The rotary driving force of the mold thickness adjustment motor 183 may be transmitted to the multiple screw nuts 182 via the rotary driving force transmission part 185. Multiple screw nuts 182 can be rotated synchronously. The multiple screw nuts 182 can be rotated individually by changing the transmission path of the rotary driving force transmission part 185.

The rotary driving force transmission part 185 is configured by, for example, gears. In this case, a driven gear is formed on the outer circumference of each screw nut 182, a driving gear is attached to the output shaft of the mold thickness adjustment motor 183, and a plurality of driven gears and an intermediate gear meshing with the driving gear are held rotatably at the center of the toggle support 130. The rotary driving force transmission part 185 may be configured by a belt, pulley or the like instead of a gear.

The operation of the mold thickness adjustment mechanism 180 is controlled by the controller 700. The controller 700 drives the mold thickness adjustment motor 183 to rotate the screw nut 182. As a result, the position of the toggle support 130 with respect to the tie bar 140 is adjusted and the interval L between the fixed platen 110 and the toggle support 130 is adjusted. A combination of multiple mold thickness adjustment mechanisms may be used.

The interval L is detected using the mold thickness adjustment motor encoder 184. The mold thickness adjustment motor encoder 184 detects the amount and direction of rotation of the mold thickness adjustment motor 183 and sends a signal indicating the result of the detection to the controller 700. The detection result of the mold thickness adjustment motor encoder 184 is used to monitor and control the position and interval L of the toggle support 130. The toggle support position detector for detecting the position of the toggle support 130 and the interval detector for detecting the interval L are not limited to the mold thickness adjustment motor encoder 184, and a general detector can be used.

The mold clamping device 100 may have a mold temperature controller to regulate the temperature of the mold device 800. The mold device 800 has a flow path of the temperature control medium inside. The mold temperature controller adjusts the temperature of the mold device 800 by adjusting the temperature of the temperature control medium supplied to the flow path of the mold device 800.

The mold clamping device 100 of the present embodiment is a horizontal type with the mold opening and closing direction in the horizontal direction, but it may be a vertical type with the mold opening and closing direction in the vertical direction.

The mold clamping device 100 in the present embodiment has the mold clamping motor 160 as a driving part. A hydraulic cylinder may be included instead of the mold clamping motor 160. The mold clamping device 100 may also have a linear motor for opening and closing the mold, and may include an electromagnet for clamping.

(Ejector Device)

In the description of the ejector device 200, as in the description of the mold clamping device 100, the moving direction of the movable platen 120 when the mold is closed (for example, the positive X-axis direction) is described as forward, and the moving direction of the movable platen 120 when the mold is opened (for example, the negative X-axis direction) is described as backward.

The ejector device 200 is attached to the movable platen 120 and moves back and forth with the movable platen 120. The ejector device 200 has an ejector rod 210 that ejects the molded product from the mold device 800 and a drive mechanism 220 that moves the ejector rod 210 in the moving direction (X-axis direction) of the movable platen 120.

The ejector rod 210 is disposed so as to move backward and forward in a through hole of the movable platen 120. The front end of the ejector rod 210 contacts an ejector plate 826 of the movable mold 820. The front end of the ejector rod 210 may or may not be connected to the ejector plate 826.

The drive mechanism 220 has, for example, an ejector motor and a motion conversion mechanism that converts the rotational motion of the ejector motor into the linear motion of the ejector rod 210. The motion conversion mechanism includes a screw shaft and a screw nut that screws into the screw shaft. A ball or roller may be interposed between the screw shaft and the screw nut.

The ejector device 200 performs the ejection process under the control of the controller 700. In the ejection process, the ejector plate 826 is moved forward and the molded product is ejected by moving forward the ejector rod 210 from the standby position to the ejection position at a set moving velocity. The ejector motor is then driven to move backward the ejector rod 210 at a set moving velocity and the ejector plate 826 is moved backward to its original standby position.

The position and moving velocity of the ejector rod 210 are detected using, for example, an ejector motor encoder. The ejector motor encoder detects the rotation of the ejector motor and sends a signal indicating the result of the detection to the controller 700. The ejector rod position detector for detecting the position of the ejector rod 210 and the ejector rod moving velocity detector for detecting the moving velocity of the ejector rod 210 are not limited to ejector motor encoders, and a general detector can be used.

(Injection Device)

In the description of the injection device 300, unlike the description of the mold clamping device 100 and the description of the ejector device 200, the moving direction of the screw 330 during filling (for example, the negative X-axis direction) is described as forward and the moving direction of the screw 330 during measuring (for example, the positive X-axis direction) is described as backward.

The injection device 300 is disposed on a slide base 301, and the slide base 301 is disposed freely moving forward and backward with respect to the injection device frame 920. The injection device 300 is placed freely moving forward and backward with respect to the mold device 800. The injection device 300 touches the mold device 800 and fills the cavity space 801 in the mold device 800 with the molding material. The injection device 300 has, for example, a cylinder 310 that heats the molding material, a nozzle 320 provided at the front end of the cylinder 310, a screw 330 that is placed in the cylinder 310 freely moving forward and backward and freely rotating, a measuring motor 340 that rotates the screw 330, an injection motor 350 that moves the screw 330 forward and backward, and a load detector 360 that detects the load transmitted between the injection motor 350 and the screw 330.

The cylinder 310 heats the molding material supplied inside from a feed port 311. The molding material includes, for example, resin and the like. The molding material is formed, for example, in the form of a pellet and is supplied to the feed port 311 in a solid state. The feed port 311 is formed at the rear of the cylinder 310. A cooler 312, such as a water-cooled cylinder, is provided on the outer periphery at the rear of the cylinder 310. In front of the cooler 312, a heater 313 such as a band heater and a temperature detector 314 are provided on the outer periphery of the cylinder 310.

The cylinder 310 is divided into multiple zones in the axial direction (for example, X-axis direction) of the cylinder 310. Each of the multiple zones is provided with the heater 313 and the temperature detector 314. A set temperature is set in each of the multiple zones, and the controller 700 controls the heater 313 so that the temperature detected by the temperature detector 314 becomes the set temperature.

A nozzle 320 is provided at the front end of the cylinder 310 and pressed against the mold device 800. The heater 313 and the temperature detector 314 are provided on the outer periphery of the nozzle 320. The controller 700 controls the heater 313 so that the detection temperature of the nozzle 320 becomes the set temperature.

The screw 330 is disposed so as to be able to rotate and move in the forward and backward direction in the cylinder 310. As the screw 330 is rotated, the molding material is sent forward along the spiral groove of the screw 330. The molding material is gradually melted by heat from the cylinder 310 while being sent forward. As the liquid molding material is sent forward of the screw 330 and accumulated at the front of the cylinder 310, the screw 330 is moved backward. When the screw 330 is then moved forward, the liquid molding material accumulated in front of the screw 330 is injected from the nozzle 320 and filled into the mold device 800.

A backflow prevention ring 331 is attached to the front of the screw 330 in a retractable manner as a backflow prevention valve to prevent backflow of the molding material from the front to the rear of the screw 330 when the screw 330 is pushed forward.

As the screw 330 is moved forward, the backflow prevention ring 331 is pushed backward by the pressure of the molding material ahead of the screw 330 and retreats relative to the screw 330 to a blocking position (see FIG. 2) that blocks the flow path of the molding material. This prevents the molding material accumulated in front of the screw 330 from flowing backward.

On the other hand, when the screw 330 is rotated, the backflow prevention ring 331 is pushed forward by the pressure of the molding material sent forward along the spiral groove of the screw 330 and moved forward relatively to the screw 330 to an open position (see FIG. 1) that opens the flow path of the molding material. This sends the molding material forward of the screw 330.

The backflow prevention ring 331 may be either a co-rotating type that rotates with the screw 330 or a non-co-rotating type that does not rotate with the screw 330.

The injection device 300 may have a driving source that moves the backflow prevention ring 331 back and forth with respect to the screw 330 between the open position and the closed position.

The measuring motor 340 rotates the screw 330. The driving source for rotating the screw 330 is not limited to the measuring motor 340, but may be, for example, a hydraulic pump and the like.

The injection motor 350 moves the screw 330 back and forth. Between the injection motor 350 and the screw 330, a motion conversion mechanism is provided to convert the rotational motion of the injection motor 350 into the linear motion of the screw 330. The motion conversion mechanism has a screw shaft, for example, and a screw nut that screws into the screw shaft. A ball, roller or the like may be provided between the screw shaft and the screw nut. The driving source for moving the screw 330 forward and backward is not limited to the injection motor 350, but may be, for example, a hydraulic cylinder and the like.

The load detector 360 detects the load transmitted between the injection motor 350 and the screw 330. The detected load is converted to pressure by the controller 700. The load detector 360 is provided in the transmission path of the load between the injection motor 350 and the screw 330 to detect the load acting on the load detector 360.

The load detector 360 sends a signal of the detected load to the controller 700. The load detected by the load detector 360 is converted into the pressure acting between the screw 330 and the molding material and is used to control and monitor the pressure the screw 330 receives from the molding material, the back pressure against the screw 330, and the pressure acting on the molding material from the screw 330.

The pressure detector for detecting the pressure of the molding material is not limited to the load detector 360, but a general detector can be used. For example, a nozzle pressure sensor or an in-mold pressure sensor may be used. The nozzle pressure sensor is installed in the nozzle 320. The in-mold pressure sensor is installed inside the mold device 800.

The injection device 300 performs a measuring process, filling process, pressure-holding process, and the like, under the control of the controller 700. The filling and pressure-holding processes may be collectively referred to as the injection process.

In the measuring process, the measuring motor 340 is driven to rotate the screw 330 at a set rotational speed and feed the molding material forward along the spiral groove of the screw 330. According to this, the molding material is gradually melted. As the liquid molding material is sent forward of the screw 330 and accumulated at the front of the cylinder 310, the screw 330 is moved backward. The rotational speed of the screw 330 is detected using, for example, the measuring motor encoder 341. The measuring motor encoder 341 detects the rotation of the measuring motor 340 and sends a signal indicating the detection result to the controller 700. The screw-rotation speed detector for detecting the rotation speed of the screw 330 is not limited to the measuring motor encoder 341, and a general detector can be used.

In the measuring process, a set back pressure may be applied to the screw 330 by driving the injection motor 350 to limit the sudden backward movement of the screw 330. The back pressure against the screw 330 is detected using, for example, the load detector 360. When the screw 330 moves backward to the measuring completion position and a predetermined amount of molding material accumulates in front of the screw 330, the measuring process is completed.

The position and rotational speed of the screw 330 in the measuring process are set together as a series of setting conditions. For example, measuring start position, rotational speed switching position, and measuring completion position are set. These positions are arranged in this order from front to back and represent the start and end points of the section where the rotational speed is set. For each section, a rotational speed is set. One or more rotational velocity switching positions may be used. The rotational speed switching position need not be set. Also, back pressure is set for each section.

In the filling process, the injection motor 350 is driven to move forward the screw 330 at a set moving velocity, and the liquid molding material accumulated in front of the screw 330 is filled into the cavity space 801 in the mold device 800. The position and moving velocity of the screw 330 are detected using, for example, the injection motor encoder 351. The injection motor encoder 351 detects the rotation of the injection motor 350 and sends a signal indicating the result of the detection to the controller 700. When the position of the screw 330 reaches the set position, switching (so-called V/P switching) from the filling process to the pressure-holding process is performed. The position where the V/P switching is performed is also called the V/P switching position. The set moving velocity of the screw 330 may be changed according to the position, time, or the like of the screw 330.

The position and moving velocity of the screw 330 in the filling process are set together as a series of setting conditions. For example, a filling start position (also called the injection start position), a moving velocity switching position, and a V/P switching position are set. These positions are arranged in this order from the rear to the front and represent the start and end points of the section in which the moving velocity is set. For each section, a moving velocity is set. The moving velocity switching position may be one or more. The moving velocity switching position need not be set.

For each section where the moving velocity of the screw 330 is set, an upper limit of the pressure of the screw 330 is set. The pressure of the screw 330 is detected by the load detector 360. If the pressure of the screw 330 is less than or equal to the set pressure, the screw 330 is moved forward at the set moving velocity. On the other hand, if the pressure of the screw 330 exceeds the set pressure, the screw 330 is moved forward at a slower moving velocity than the set moving velocity so that the pressure of the screw 330 is less than or equal to the set pressure for the purpose of mold protection.

After the position of the screw 330 reaches the V/P switching position in the filling process, the screw 330 may be temporarily stopped at the V/P switching position, and then the V/P switching may be performed. Just before the V/P switch, a slow forward or slow backward movement of the screw 330 may be performed instead of stopping the screw 330. Moreover, the screw position detector for detecting the position of the screw 330 and the screw moving velocity detector for detecting the moving velocity of the screw 330 are not limited to the injection motor encoder 351, and a general detector can be used.

In the pressure-holding process, the injection motor 350 is driven to push the screw 330 forward, keeping the pressure of the molding material at the front end of the screw 330 (hereafter, it is also called "holding pressure") at a set pressure and pushing the remaining molding material in the cylinder 310 toward the mold device 800. The missing molding material due to cooling shrinkage in the mold device 800 can be replenished. The holding pressure is detected using, for example, the load detector 360. The set value of the holding pressure may be changed according to the elapsed time from the start of the pressure-holding process and the like. The holding pressure in the pressure-holding process and the holding time for holding the holding pressure may be set multiple times, respectively, and may be set together as a series of setting conditions.

In the pressure-holding process, the molding material in the cavity space 801 in the mold device 800 is gradually cooled, and upon completion of the pressure-holding process, the inlet of the cavity space 801 is blocked by the solidified molding material. This condition is called a gate seal and prevents backflow of the molding material from the cavity space 801. After the pressure-holding process, a cooling process is initiated. The cooling process involves solidifying the molding material in the cavity space 801. The measuring process may be performed during the cooling process for the purpose of shortening the molding cycle time.

The injection device 300 of the present embodiment is an in-line screw system, but a pre-plastic system or the like may be used. The pre-plastic injection equipment supplies the injection cylinder with the molding material melted in the plasticizing cylinder, and the injection cylinder injects the molding material into the mold device. Within the plasticizing cylinder, the screw is rotatably and non-movably positioned in the forward and backward direction or the screw is rotatably and movably positioned in the forward and backward direction. On the other hand, in the injection cylinder, a plunger is placed freely moving forward and backward.

In addition, the injection device 300 of the present embodiment may be a horizontal type in which the axial direction of the cylinder 310 is horizontal, or a vertical type in which the axial direction of the cylinder 310 is vertical. The mold clamping device combined with the vertical injection device 300 may be either vertical or horizontal. Similarly, the mold clamping device combined with the horizontal injection device 300 may be either horizontal or vertical.

(Moving Device)

In the description of the moving device 400, as in the description of the injection device 300, the moving direction of the screw 330 during filling (for example, the negative X-axis direction) is referred to as the front, and the moving direction of the screw 330 during measuring (for example, the positive X-axis direction) is referred to as the rear.

The moving device 400 moves the injection device 300 forward and backward with respect to the mold device 800. The moving device 400 also presses the nozzle 320 against the mold device 800 to produce a nozzle touch pressure. The moving device 400 includes a hydraulic pump 410, a motor 420 as a driving source, a hydraulic cylinder 430 as a hydraulic actuator and the like.

The hydraulic pump 410 has a first port 411 and a second port 412. The hydraulic pump 410 is a pump that can rotate in both directions, and by switching the rotation direction of the motor 420, hydraulic fluid (for example, oil) is taken in from one of the first port 411 and the second port 412 and discharged from the other to generate hydraulic pressure. The hydraulic pump 410 can also suck the hydraulic fluid from the tank and discharge the hydraulic fluid from either the first port 411 or the second port 412.

The motor 420 operates the hydraulic pump 410. The motor 420 drives the hydraulic pump 410 in a rotational direction and a rotational torque according to a control signal from the controller 700. The motor 420 may be an electric motor or an electric servomotor.

The hydraulic cylinder 430 has a cylinder body 431, a piston 432, and a piston rod 433. The cylinder body 431 is fixed to the injection device 300. The piston 432 divides the inside of the cylinder body 431 into a front chamber 435 as a first chamber and a rear chamber 436 as a second chamber. The piston rod 433 is fixed to the fixed platen 110.

The front chamber 435 of the hydraulic cylinder 430 is connected to the first port 411 of the hydraulic pump 410 through a first flow path 401. The hydraulic fluid discharged from the first port 411 is supplied to the front chamber 435 through the first flow path 401, and the injection device 300 is pushed forward. The injection device 300 is moved forward and the nozzle 320 is pressed against the fixed mold 810. The front chamber 435 functions as a pressure chamber that generates the nozzle touch pressure of the nozzle 320 by the pressure of the hydraulic fluid supplied from the hydraulic pump 410.

On the other hand, the rear chamber 436 of the hydraulic cylinder 430 is connected to the second port 412 of the hydraulic pump 410 through the second flow path 402. When the hydraulic fluid discharged from the second port 412 is supplied to the rear chamber 436 of the hydraulic cylinder 430 through the second flow path 402, the injection device 300 is pushed backward. The injection device 300 is moved backward and the nozzle 320 is separated from the fixed mold 810.

In the present embodiment, the moving device 400 includes a hydraulic cylinder 430, but the present invention is not limited to this. For example, instead of the hydraulic cylinder 430, an electric motor and a motion conversion mechanism that converts the rotational motion of the electric motor into the linear motion of the injection device 300 may be used.

(Controller)

The controller 700 is configured by, for example, a computer and has a Central Processing Unit (CPU) 701, a storage medium 702 such as a memory, an input interface 703, an output interface 704, and a communication interface 705 as illustrated in FIGS. 1 and 2. The controller 700 performs various controls by having the CPU 701 execute the program stored in the storage medium 702. In addition, the controller 700 receives a signal from the outside at the input interface 703 and transmits a signal to the outside at the output interface 704. In addition, the controller 700 may send and receive information to and from an information processing device (e.g., personal computer) connected via a network with the communication interface 705.

The controller 700 repeatedly manufactures the molded product by repeating the measuring process, mold closing process, pressure-boosting process, clamping process, filling process, pressure-holding process, cooling process, depressurization process, mold opening process, ejection process, and the like. The sequence of operations to obtain the molded product, for example, from the beginning of the measuring process to the beginning of the next measuring process, is also called a "shot" or "molding cycle". The time required for one shot is also called the "molding cycle time" or "cycle time."

One molding cycle has, for example, the measuring process, mold closing process, pressure-boosting process, mold clamping process, filling process, pressure-holding process, cooling process, depressurizing process, mold opening process, and ejection process, in this order. The order here is the order of the start of each process. The filling process, pressure-holding process, and cooling process are performed during the clamping process. The start of the clamping process may coincide with the start of the filling process. The completion of the depressurization process coincides with the start of the mold opening process.

For the purpose of shortening the molding cycle time, multiple processes may be performed simultaneously. For example, the measuring process may be performed during the cooling process of the previous molding cycle or during the clamping process. In this case, the mold closing process may be performed at the beginning of the molding cycle. The filling process may also be started during the mold closing process. The ejection process may also be started during the mold opening process. If an on-off valve is provided to open and close the flow path of the nozzle 320, the mold opening process may be started during the measuring process. This is because even if the mold opening process is started during the measuring process, the molding material does not leak from the nozzle 320 if the on-off valve closes the flow path of the nozzle 320.

It should be noted that a single molding cycle may have processes other than the measuring process, mold closing process, pressure-boosting process, mold clamping process, filling process, pressure-holding process, cooling process, depressurizing process, mold opening process, and ejection process.

For example, after the completion of the pressure-holding process and before the start of the measuring process, a pre-measuring suck back process may be performed in which the screw 330 is moved backward to a preset measuring start position. The pressure of the molding material accumulated ahead of the screw 330 before the start of the measuring process can be reduced and the sudden backward movement of the screw 330 at the start of the measuring process can be prevented.

After the completion of the measuring process and before the start of the filling process, a post-measuring suck back process may be performed in which the screw 330 is moved backward to a preset filling start position (also called the injection start position). The pressure of the molding material accumulated ahead of the screw 330 before the start of the filling process can be reduced and the leakage of the molding material from the nozzle 320 before the start of the filling process can be prevented.

The controller 700 is connected to an operating device 750 that accepts input operations by the user and a display 760 that displays a screen. The operating device 750 and the display 760 are configured by, for example, a touch panel 770 and may be integrated.

The display 760 is equipped with a liquid crystal panel (an example of a display part) for displaying a screen.

The touch panel 770 as the display 760 displays the screen under control by the controller 700. Information such as the settings of the injection molding machine 10 and the current status of the injection molding machine 10 may be displayed on the screen of the touch panel 770. Moreover, on the screen of the touch panel 770, for example, an operation part such as a button or an input column for accepting an input operation by the user may be displayed. The touch panel 770 as the operating device 750 detects an input operation on the screen by the user and outputs a signal corresponding to the input operation to the controller 700. Thus, for example, while confirming the information displayed on the screen, the user can operate the operation part provided on the screen to set the injection molding machine 10 (including input of setting values) and the like. When the user operates the operation part provided on the screen, the operation of the injection molding machine 10 corresponding to the operation part can be performed. The operation of the injection molding machine 10 may be, for example, the operation (including stopping) of the mold clamping device 100, the ejector device 200, the injection device 300, the moving device 400, and the like. In addition, the operation of the injection molding machine 10 may be such as switching the screen displayed on the touch panel 770 as the display 760.

The operating device 750 and the display 760 of the present embodiment are described as being integrated as the touch panel 770, but they may be provided independently. In addition, a plurality of operating devices 750 may be provided. The operating device 750 and the display 760 are arranged on the operating side (negative Y-axis direction) of the mold clamping device 100 (more specifically, the fixed platen 110).

First Embodiment

Figure 3:
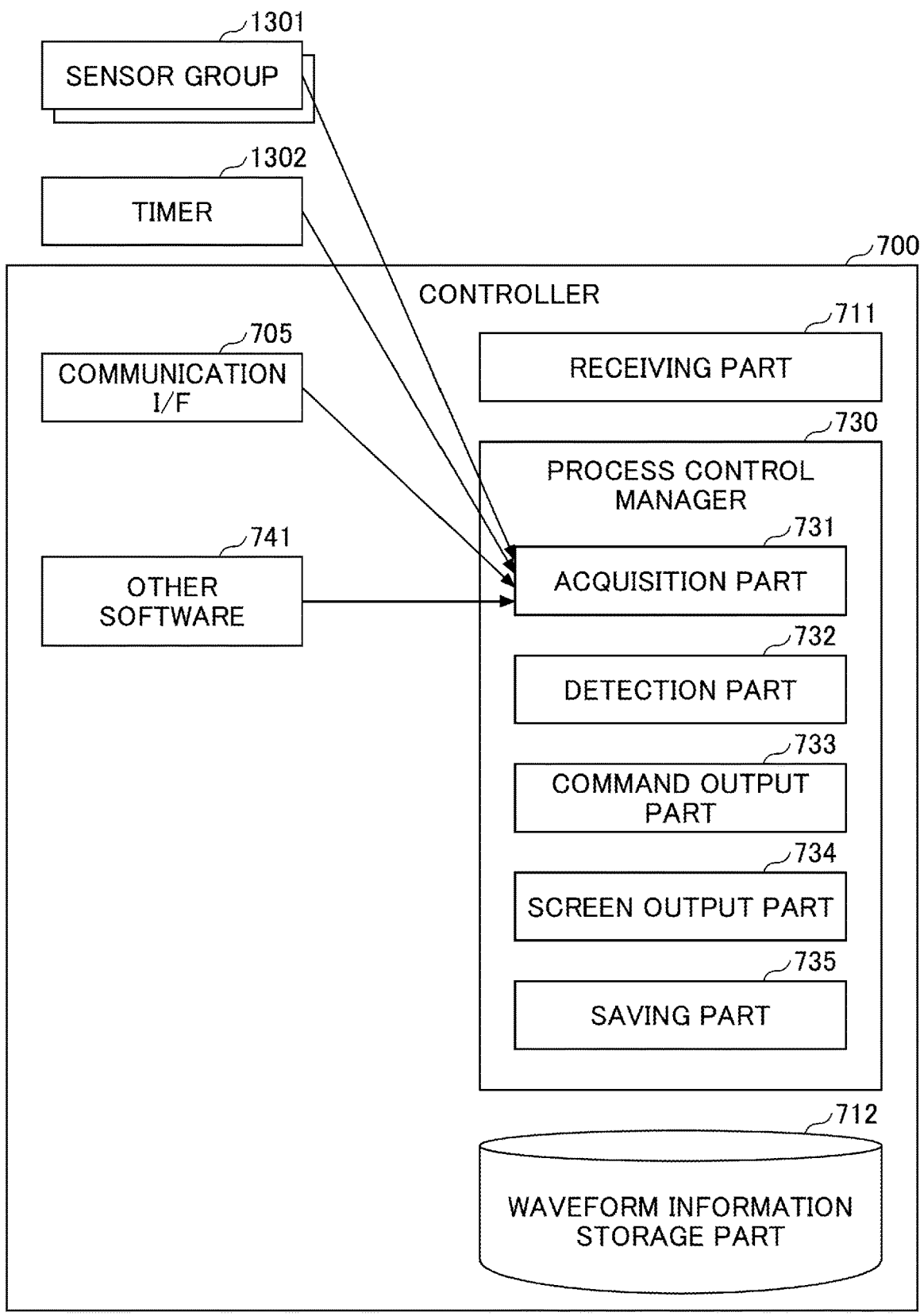
FIG. 3 is a functional block diagram illustrating components of a controller according to the first embodiment.

FIG. 3 is a functional block diagram illustrating the components of the controller 700 according to the first embodiment. The functional blocks illustrated in FIG. 3 are conceptual, and need not be physically constructed as illustrated. All or part of each functional block can be functionally or physically distributed and integrated in an arbitrary unit. All or an optional part of each processing function performed in each function block is realized by a program executed by the CPU 701. Alternatively, each functional block may be implemented as hardware by wire logic. As illustrated in FIG. 3, the controller 700 includes a receiving part 711 and a process control manager 730. Further, the controller 700 includes a waveform information storage part 712 in the storage medium 702.

The controller 700 also uses the sensor group 1301 provided in the injection molding machine 10 and acquires signals indicating detection results. Similarly, the controller 700 obtains a clock signal indicating timekeeping information from the timer 1302.

The waveform information storage part 712 stores information indicating detection results represented by signals received from the sensor group 1301.

The receiving part 711 accepts the user's operations from the touch panel 770 via the input interface 703.

The process control manager 730 includes an acquisition part 731, a detection part 732, a command output part 733, a screen output part 734, and a saving part 735 to control the processes of the injection molding machine 10.

Figure 4:
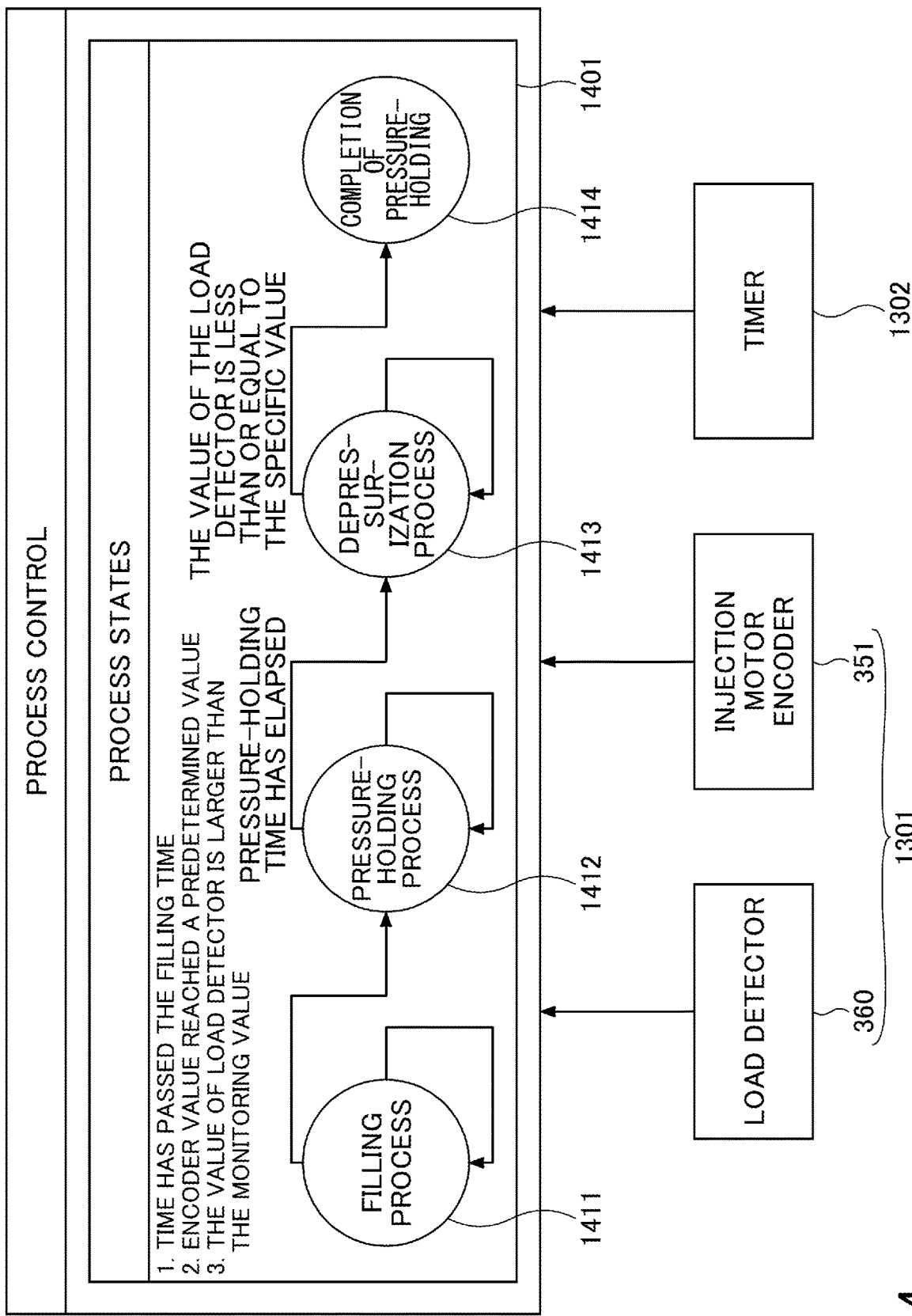
FIG. 4 is a diagram illustrating a concept of the process executed by a process control manager for the first embodiment.

FIG. 4 is a diagram illustrating a concept of the process executed by the process control manager 730 according to the present embodiment. As illustrated in FIG. 4, the process control manager 730 determines the process status of the injection molding machine 10 based on a combination of multiple conditions, including the load detector 360, the injection motor encoder 351 (an example of the sensor including the sensor group 1301), and the timer 1302, and controls based on the process status. The load detector 360 is an example of the sensor including the sensor group 1301 and measures the pressure in the mold device 800.

In other words, the process control manager 730 maintains one or more conditions for each process to determine whether or not the process is an appropriate process. In order to detect whether or not the process has started, a combination of various conditions is possible, not just a signal from a single sensor, as in the past. In other words, the process control manager 730 provides more detailed process control than in the past.

In the example illustrated in FIG. 4, the process control manager 730 includes a filling process 1411, a pressure-holding process 1412, a depressurization process 1413, and a completion of pressure-holding 1414 as process states to be managed.

The criteria for detecting whether or not the filling process 1411 is completed is when one or more of the three conditions are met. The three conditions are:
1) when the preset filling time has elapsed;
2) when the injection motor encoder 351 (encoder value) reaches a predetermined value; and
3) when the value of the pressure received from the molding material measured by the load detector 360 in the injection device 300 (hereinafter also referred to as the value of the load detector 360) reaches a predetermined monitoring value.

When the process control manager 730 detects that any one of the three conditions is met and the filling process 1411 is detected to be completed, the current process is changed to the pressure-holding process 1412. The predetermined and monitored values shall be values set according to the embodiment.

The criterion for detecting whether the pressure-holding process 1412 is completed is when the preset pressure-holding time has elapsed since the pressure-holding process started. When the process control manager 730 detects that the pressure-holding process 1412 is completed, the current process is moved to the depressurization process 1413. The pressure-holding time shall be a time determined according to the embodiment.

The criterion for detecting whether or not the depressurization process 1413 is completed is when the value of the load detector 360 falls below the specified value. When the process control manager 730 detects that the depressurization process 1413 is completed, the current process moves to the completion of pressure-holding 1414. The specified value is a value determined according to the embodiment.

After the pressure-holding is completed (1414), there are processes such as the mold opening process. It should be noted that the explanation of mold-opening process or the like is omitted because the process control manager 730 is same as in managing the process or the like by setting conditions corresponding to each process.

In detecting whether or not the process is an appropriate process, a combination of several conditions and the elapse of pressure-holding time may be included. In other words, there are many situations where it is difficult to determine whether the process has switched or not by detecting changes with conventional sensors. Therefore, in the present embodiment, the process control manager 730 beforehand maintains a condition for each process that combines signals from the sensor group 1301, time information measured by the timer 1302, information received via the communication interface 705, and events generated by other software 741, to detect whether the condition is met or not. This allows the process control manager 730 to recognize the current process status.

The process control manager 730 also outputs control commands corresponding to the current process. This allows the injection molding machine 10 to achieve control of each process.

Returning to FIG. 3, the acquisition part 731 acquires information necessary to detect the process. For example, the acquisition part 731 acquires signals from each sensor included in the sensor group 1301. The sensors that acquire signals include, for example, the load detector 360 and the injection motor encoder 351, illustrated in FIG. 4.

The acquisition part 731 also acquires a clock signal representing time from the timer 1302. In addition, the acquiring part 731 acquires communication information received from an external device via the communication interface 705. Furthermore, the acquiring part 731 acquires events from other software 741 running in the controller 700.

The detection part 732 detects whether or not the process has been started based on the preset conditions for each process performed by the injection molding machine 10. If there are multiple predetermined conditions for the process, the detection part 732 detects whether or not the process has started based on the combination of the multiple conditions.

The predetermined conditions for each process performed in the injection molding machine 10 may include one or more of the following: signals from each of the sensor groups 1301 provided in the injection molding machine 10, the time since the start of a predetermined process as measured by a clock signal received from the timer 1302, communication information received from an external device via the communication interface 705, and events obtained from other software 741.

Signals from each of the sensor groups 1301 used to detect whether or not the process has switched (i.e. whether or not a given process has changed to a subsequent process) may be, for example, a signal from the load detector 360 or a signal from the injection motor encoder 351.

The time measured by the clock signal received from the timer 1302 used to detect if the process has switched can be, for example, the pressure-holding time. The pressure-holding time is the time from the start of pressure-holding (an example of a predetermined process).

Communication information received from an external device via the communication interface 705 may include information received from an ejector that ejects a molded product from the injection molding machine 10, indicating that the molded product has been ejected.

Events obtained from other software 741 may include the control results by the program controlling the clamping motor 160.

Thus, the detection part 732 detects whether or not a process performed by the injection molding machine has started based on the various conditions described above.

The command output part 733 outputs commands for control corresponding to the process when the detection part 732 detects that a predetermined process has started. For example, if the detection part 732 detects that the mold closing process has started, the command output part 733 outputs a control command that causes the clamping motor 160 to start moving forward at the set travel velocity to the mold closing completion position. Furthermore, when the detection part 732 detects that the pressure-holding process has started, the command output part 733 outputs a control command to drive the injection motor 350 to push the screw 330 forward.

The saving part 735 stores the waveform data obtained by the acquisition part 731 from each of the sensors in the sensor group 1301, representing changes in the performance values detected by the sensor, in the waveform information storage part 712.

The saving part 735 in the present embodiment starts saving the waveform data detected in the process in the waveform information storage part 712 when the detection part 732 detects that the predetermined process has started. The waveform data detected in the process should be the waveform data showing the performance values detected by each sensor of the sensor group 1301 in the process. Furthermore, a predetermined process to start saving waveform data could be, for example, a process set by the user. When the user sets a predetermined process for displaying waveform data on the display screen and the like, the detection part 732 detects whether or not the predetermined process has been started. Furthermore, the saving part 735 may save waveform data representing changes in the performance values detected in the subsequence processes after the process in the waveform information storage part 712.

It should be noted that the present embodiment is not limited to the above-mentioned timing for starting to save the waveform data. For example, the saving part 735 may continue to store the waveform data detected by each of the sensors in the sensor group 1301, as acquired by the acquisition part 731, in the waveform information storage part 712, regardless of the process currently being performed.

The screen output part 734 outputs data of a display screen and the like to the touch panel 770. For example, when the screen output part 734 detects that a predetermined process has started by the detection part 732, the screen output reads waveform data (an example of waveform information) indicating performance values detected in the process from the waveform information storage part 712 and outputs a display screen including the waveform data to the touch panel 770. Although this example describes an example of outputting the display screen and the like to the touch panel 770, the destination of data output is not limited to the touch panel 770. For example, the screen output part 734 may output data of the display screen and the like to an information processing device connected via a network.

Figure 5:
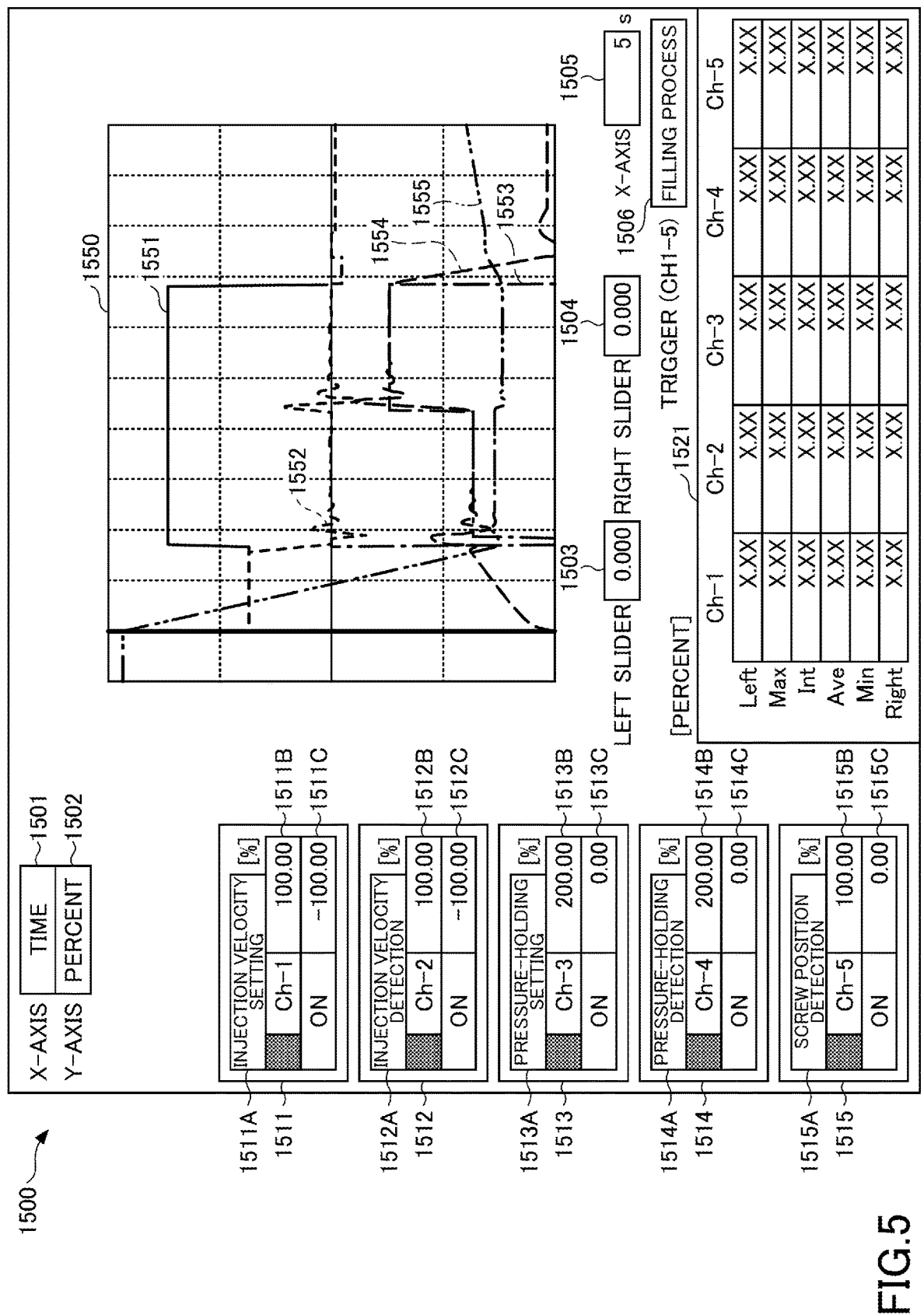
FIG. 5 is a diagram illustrating a display screen output by a screen output part of according to the first embodiment.

FIG. 5 is a diagram illustrating a display screen output by the screen output part 734 of the present embodiment.

As illustrated in FIG. 5, the display screen 1500 indicates an X-axis unit field 1501, a Y-axis unit field 1502, a left slider 1503, a right slider 1504, an X-axis field 1505, and a trigger (CH1-5) field 1506. Further, on the display screen 1500, five channel fields (the 1st channel field 1511 to the 5th channel field 1515), a selection range display field 1521, and waveform data field (an example of area so as to display the waveform data) 1550 are indicated. In the present embodiment, the channel field is a field for selecting an item to be displayed.

In the display screen illustrated in FIG. 5, the performance values detected by the various sensors are displayed. In this specification, when the performance value of the current shot can be displayed in real time in the display screen of the present embodiment. Alternatively, the performance value of the past shot may also be display.

Next, the display screen is explained in the following. The X-axis unit field 1501 is a field for selecting a unit to be displayed on the X-axis of the waveform data field 1550. The Y-axis unit field 1502 is a field for selecting a unit to be displayed on the Y-axis of the waveform data field 1550. For example, "percent" or "engineering unit" can be selected in the Y-axis unit field 1502. The X-axis field 1505 is a field for setting a range of the X-axis (for example, time) to be displayed in the waveform data field 1550.

The left slider 1503 is a field for setting the left end (display start position) of the waveform data field 1550 on the X-axis in order to set the range to be displayed in the selection range display field 1521. The right slider 1504 is a field for setting the right end (display end position) of the waveform data field 1550 on the X-axis in order to set the range to be displayed in the selection range display field 1521.

The trigger (CH1-5) field 1506 is a field for selecting a process to be displayed in the waveform data field 1550. The trigger (CH1-5) field 1506 according to the present embodiment is, for example, of a menu type, and the user performs an operation of selecting a process to be displayed from the menu displayed in the trigger (CH1-5) field 1506 via the operating device 750.

FIG. 5 illustrates an example such that "Filling process" is set in the trigger (CH1-5) field 1506. In the example illustrated in FIG. 5, the screen output part 734 starts displaying the waveform data of each item set in the five channel fields (the 1st channel field 1511 to the 5th channel field 1515) to the waveform data field 1550, when the detection part 732 detects the "Filling process" has been started.

The screen output part 734 reads waveform data of the process from the waveform information storage part 712 so as to display the waveform data based on performance values detected by various sensors.

Not only the performance values detected by the various sensors, but also setting information set by a user is included in the channel fields (the 1st channel field 1511 to the 5th channel field 1515) in the present embodiment. The screen output part 734 displays the waveform data based on setting information saved in the storage medium 702.

In other words, the screen output part 734 starts rendering waveform data of the process to the waveform data field 1550 when the detection part 732 detects that the process is switched to a process set in the trigger (CH1-5) field 1506. Next, each item of the screen display will be explained.

The five channel fields (the first channel field 1511 to the fifth channel field 1515) are fields for selecting items to be displayed as waveform data in the waveform data field 1550. That is, in the present embodiment, 5 pieces of waveform data relating to the items assigned to each channel can be displayed in the waveform data field 1550.

The first channel field 1511 is a field for setting an item in Ch-1. An item to be displayed is set in the item field 1511A, a maximum value (an example of scale information) to be displayed as waveform data of the item Ch-1 is set in the maximum value field 1511B, and a minimum value (an example of scale information) to be displayed as waveform data of the item Ch-1 is set in the minimum value field 15110.

When the item field 1511A is pressed via the operating device 750 (for example, touch panel 770), the screen output part 734 outputs a menu screen on which a plurality of items are displayed. The receiving part 711 receives the selection of the item (each setting and detection result of each sensor) to be set to Ch-1 from the menu screen. The description of the item fields 1512A to 1515A is similarly omitted.

The maximum value field 1511B and the minimum value field 1511C are fields in which numerical values can be input. The receiving part 711 receives the input of the numerical value set in the maximum value field 1511B or the minimum value field 15110 via the operating device 750. The maximum value fields 1512B to 1515B and the minimum value columns 1512C to 1515C are likewise omitted.

In each channel field, "ON" or "OFF" is displayed so as to be settable. When "ON" is selected, the waveform data of the relevant item is displayed, and when "OFF" is selected, the waveform data of the relevant item is not displayed.

In FIG. 5, "Injection velocity setting" is set in the item field 1511A, "100.00" is set in the maximum value field 1511B, and "−100.00" is set in the minimum value field 1511C. The "Injection velocity setting" indicates the setting of the injection velocity of the screw 330 set by the user.

The second channel field 1512 is a field for setting an item in Ch-2. An item to be displayed is set in the item field 1512A, a maximum value (an example of scale information) to be displayed as waveform data of the item Ch-2 is set in the maximum value field 1512B, and a minimum value (an example of scale information) to be displayed as waveform data of the item Ch-2 is set in the minimum value field 1512G.

In FIG. 5, "Injection velocity detection" is set in the item field 1512A, "100.00" is set in the maximum value field 1512B, and "−100.00" is set in the minimum value field 1512C. "Injection velocity detection" indicates the injection velocity of the screw 330 detected by the injection motor encoder 351.

The third channel field 1513 is a field for setting an item in Ch-3. An item to be displayed is set in the item field 1513A, a maximum value (an example of scale information) to be displayed as waveform data of the item Ch-3 is set in the maximum value field 1513B, and a minimum value (an example of scale information) to be displayed as waveform data of the item Ch-3 is set in the minimum value field 1513G.

In FIG. 5, "Pressure-holding setting" is set in the item field 1513A, "200.00" is set in the maximum value field 1513B, and "0.00" is set in the minimum value field 1513C. The "Pressure-holding setting" indicates the value of the pressure-holding set by the user.

The fourth channel field 1514 is a field for setting an item in Ch-4. An item to be displayed is set in the item field 1514A, a maximum value (an example of scale information) to be displayed as waveform data of the item Ch-4 is set in the maximum value field 1514B, and a minimum value (an example of scale information) to be displayed as waveform data of the item Ch-4 is set in the minimum value field 1514G.

In FIG. 5, "Pressure-holding detection" is set in the item field 1514A, "200.00" is set in the maximum value field 1514B, and "0.00" is set in the minimum value field 1514C. "Pressure-holding detection" indicates the value of the pressure-holding detected by the load detector 360.

The fifth channel field 1515 is a field for setting an item in Ch-5. An item to be displayed is set in the item field 1515A, a maximum value (an example of scale information) to be displayed as waveform data of an item of Ch-5 is set in the maximum value field 1515B, and waveform data of an item of Ch-5 is displayed in the minimum value field 1515C.

In FIG. 5, "Screw position detection" is set in the item field 1515A, "100.00" is set in the maximum value field 1515B, and "0.00" is set in the minimum value column 15150. "Screw position detection" indicates the position of the screw 330 detected by the injection motor encoder 351.

The waveform data field 1550 of FIG. 5 is a field for displaying waveform data of each item set in each of the five channel fields (the 1st channel field 1511 to the 5th channel field 1515) in the process indicated in the trigger (CH1-5) field 1506.

The waveform data 1551 in the waveform data field 1550 indicates a change in the "Injection velocity setting" setting information set in the first channel field 1511 (Ch-1).

The maximum value of the waveform data field 1550 for displaying the waveform data 1551 is the value set in the maximum value field 1511B, and the minimum value of the waveform data field 1550 for displaying the waveform data 1551 is the value set in the minimum value field 1511C. The maximum value and the minimum value of the waveform data displayed in the waveform data field 1550 are similarly omitted in the following description.

The waveform data 1552 indicates a change in a detection result (an example of a performance value) of "Injection velocity detection" set in the second channel field 1512 (Ch-2).

The waveform data 1553 indicates a change in the setting information of the "Pressure-holding setting" set in the third channel field 1513 (Ch-3). The waveform data 1554 indicates a change in a detection result (an example of a performance value) of the "Pressure-holding detection" set in the fourth channel field 1514 (Ch-4).

The waveform data 1555 indicates a change in a detection result (an example of a performance value) of "Screw position detection" set in the fifth channel field 1515 (Ch-5).

The receiving part 711 of the present embodiment receives a selection of item for the item fields 1511R to 1515A. After the receiving part 711 receives the selection of the item, the screen output part 734 starts displaying the waveform data of each item set in the five channel fields (the 1st channel field 1511 to the 5th channel field 1515) to the waveform data field 1550, when the detection part 732 detects that the process is a process set in the trigger (CH1-5) field 1506.

The receiving part 711 receives numerical input operations via the operating device 750 for the left slider 1503 (the starting value on the left side of the X-axis of the waveform data field 1550) and the right slider 1504 (the ending value on the right side of the X-axis of the waveform data field 1550).

The selection range display field 1521 is a field in which statistical values, start values, end values, and the like for each item set in each channel field are displayed as a list within the range set by the left slider 1503 and the right slider 1504.

In the selection range display field 1521 illustrated in FIG. 5, statistical values or the like of items set in each of the channels (Ch-1 to Ch-5) are illustrated, for example, a start value (Left) at the left end, a maximum value (Max) within the range, an integral value (Int) within the range, an average value (Ave) within the range, a minimum value (Min) within the range, and an end value (Right) at the right end. The statistical values and the like for each item illustrated in the selection range display field 1521 are illustrated as an example, and other statistical values and the like may be displayed.

The display 760 displays the display screen and the like illustrated in FIG. 5 by an instruction from the controller 700. In other words, the display 760 displays the waveform data representing changes of the performance values detected as of a given process (including the given process and the process after the given process) when the controller 700 detects that the injection molding machine 10 starts the process set in the trigger (CH1-5) field 1506. In the present embodiment, the following is an example of displaying performance values for a process that is determined to have been started. However, the present embodiment is not limited to the case where the display 760 displays the performance values of the process determined to have started, but the display 760 may also display the performance values of the process to be performed after the process.

Figure 6:
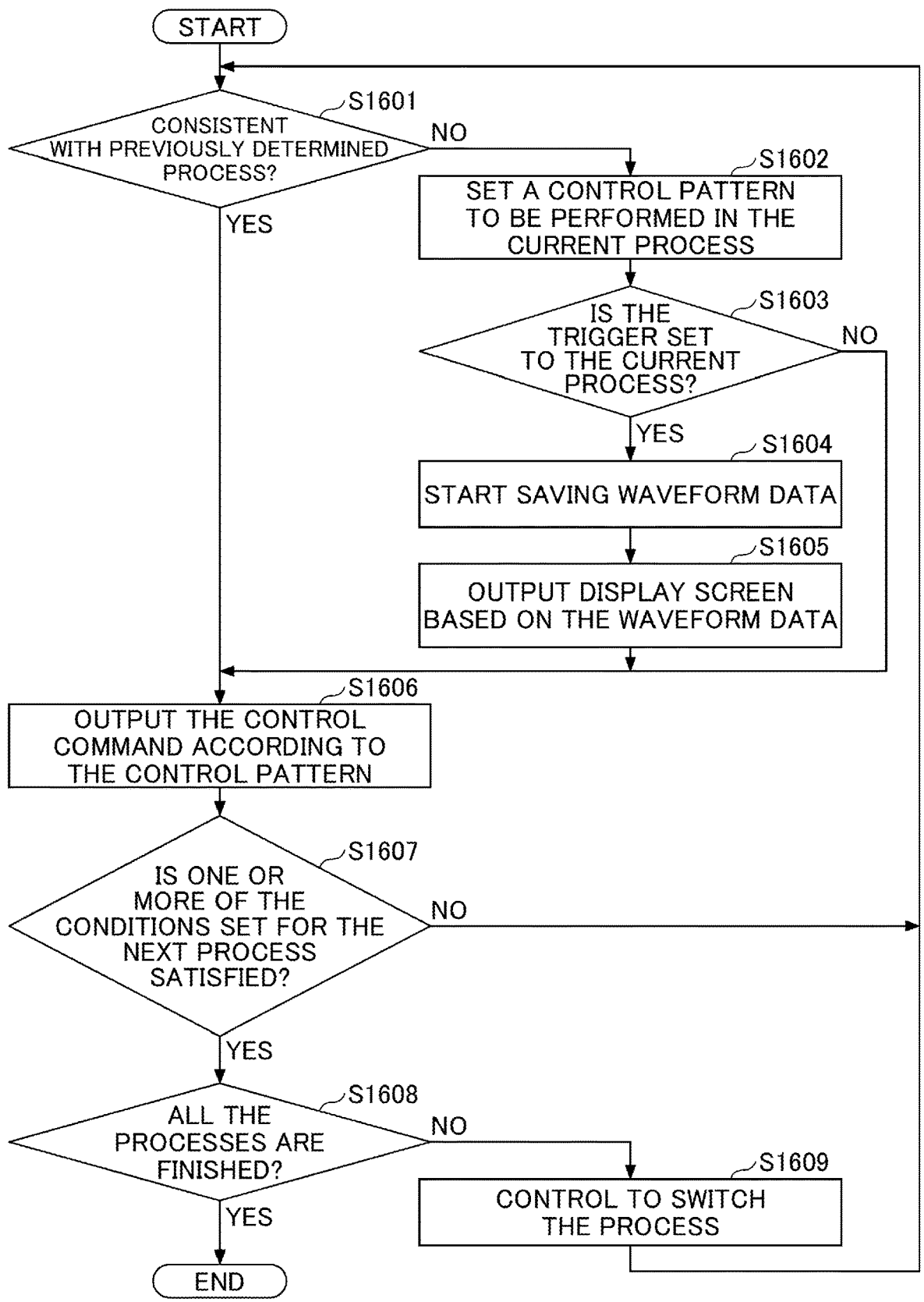
FIG. 6 is a flowchart illustrating a control procedure for displaying performance values of the process on the display screen in real time in the controller according to the first embodiment.

Next, the control procedure for displaying the performance values of the process on the display screen in real time in the controller 700 of the first embodiment will be explained. FIG. 6 is a flowchart illustrating the control procedure for displaying the performance values of the process on the display screen in real time in the controller 700 of the first embodiment. In the example illustrated in FIG. 6, the process is taken from the "Filling process" illustrated in FIG. 4. For this reason, the processing is performed after the "Filling process" is determined by the detection part 732.

First, the detection part 732 detects whether the process at the time previously detected and the current process are the same or not (S1601). For example, when the process at the time previously detected was the "filling process" and the current process is the "filling process", the detection part 732 detects that the two processes are consistent with each other.

If the detection part 732 detects that the processes are consistent with each other (S1601: Yes), the process moves to a process S1606.

On the other hand, if the detection part 732 detects that the processes are not consistent with each other (S1601: No), the command output part 733 sets the pattern (procedure) of control to be performed in the current process (S1602).

The screen output part 734 determines whether the process set in the trigger (CH1-5) field 1506 of the currently displayed display screen is the current process or not (S1603). If the screen output part 734 determines that the process is not the current process (S1603: No), the process moves to S1606.

When the screen output part 734 determines that the process set in the trigger (CH1-5) field 1506 of the currently displayed display screen is the current process (S1603: Yes), the saving part 735 starts saving the waveform data indicating the changes of the performance values by signals from the sensor group 1301 in the waveform information storage part 712 (S1604).

Then, the screen output part 734 outputs the screen display generated based on the waveform data saved in the waveform information storage part 712 to the display 760 (S1605).

The command output part 733 outputs the control command in accordance with the control pattern and the performance values from the sensors included in the sensor group 1301 in the current process (S1606).

Next, the detection part 732 detects whether or not at least one or more of conditions set for starting the next process have been satisfied (S1607).

For example, when the current process is the "filling process", the detection part 732 detects whether or not time has passed the filling time, whether or not the injection motor encoder 351 has reached a preset value, and whether or not a pressure-value being applied from the molded material measured by the load detector 360 in the injection device 300 has reached a preset monitored value.

If the current process is the "pressure-holding process", the detection part 732 detects whether or not the preset pressure-holding time has elapsed since the pressure-holding process started.

If the current process is the "depressurization process", the detection part 732 detects whether or not the value of the load detector 360 has dropped below a predetermined value.

If the detection part 732 detects that none of the conditions corresponding to the current process are satisfied (S1607: No), the process is performed again from S1601.

If the detection part 732 detects that one or more of the conditions corresponding to the current process have been met (S1607), the detection part 732 detects whether or not all processes have been completed (S1608). If the detection part 732 detects that all processes have not been completed (S1608: No), switching control from the current process to the next process is performed (S1609). Then, the process is performed again from S1601.

On the other hand, if the detection part 732 detects that all processes have been completed (S1608: Yes), the process is ended.

The controller 700 of the present embodiment can display the display screen corresponding to the current process by the processing procedure described above.

Furthermore, the controller 700 of the present embodiment is not limited to the display screen illustrated in FIG. 5, but may display multiple waveform data fields.

Figure 7:
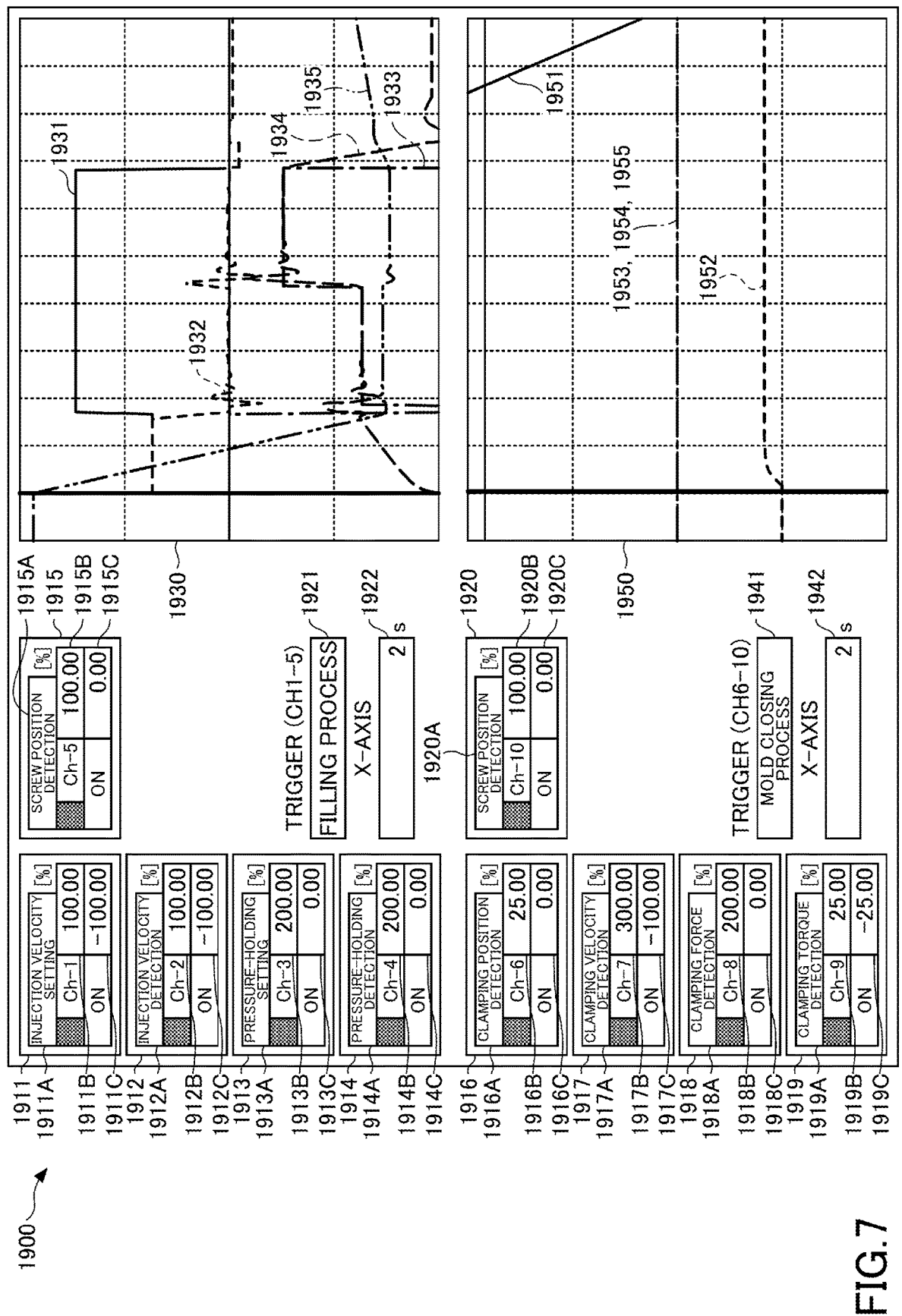
FIG. 7 is a diagram illustrating a display screen output by the output part according to the first embodiment.

FIG. 7 is a diagram illustrating a display screen output by the output part 713 of the present embodiment. As illustrated in FIG. 7, the display screen 1900 displays the waveform data field 1930 of "Filling process" of the first process and the waveform data field 1950 of "Mold closing process" of the second process.

On the display screen 1900, a trigger (CH1-5) field 1921 and an X-axis field 1922 of the first process (for example, "Filling process") are illustrated. Further, on the display screen 1900, five channel fields (the 1st channel field 1911 to the 5th channel field 1915) for the first process (for example, "Filling process") and waveform data field 1930 are illustrated.

The five channel fields (the 1st channel field 1911 to the 5th channel field 1915) are the same as the channel fields (the 1st channel field 1511 to the 5th channel field 1515) illustrated in FIG. 5, and description thereof is omitted.

As in the waveform data field 1550 of the first embodiment, the waveform data 1931 to 1935 illustrated in the waveform data field 1930 indicates a change in the setting information of each item illustrated in the first channel field 1511 to the fifth channel field 1515 or a change in the performance value.

In the example illustrated in FIG. 7, when the detection part 732 detects that the process set in the trigger (CH1-5) field 1921 (for example, "Filling process") has been triggered, the screen output part 734 starts rendering the waveform data for the process in the waveform data field 1930.

On the display screen 1900, a trigger (CH6-10) field 1941 and an X-axis field 1942 of the second process (for example, "Mold closing process") are indicated. Further, on the display screen 1900, five channel fields (the 6th channel field 1916 to the 10th channel field 1920) for the second process (for example, "Mold closing process") and a waveform data field 1950 are indicated.

In the trigger (CH6-10) field 1941, the process "Mold closing process" is displayed. Items corresponding to the "Mold closing process" are set in the five channel fields (the 6th channel field 1916 to the 10th channel field 1920).

In this example, "clamping position detection" is set in the item field 1916A, "25.00" is set in the maximum value field 1916B, and "0.00" is set in the minimum value field 1916C. "Clamping position detection" indicates the position of the movable platen 120 converted from the position of the crosshead 151 detected by the clamping motor encoder 161.

In this example, "clamping velocity detection" is set in the item field 1917A, "300.00" is set in the maximum value field 1917B, and "−100.00" is set in the minimum value field 1917C. "Injection velocity detection" indicates the velocity of the crosshead 151 detected by the clamping motor encoder 161.

In this example, "clamping force detection" is set in the item field 1918A, "200.00" is set in the maximum value field 1918B, and "0.00" is set in the minimum value field 1918C. "Clamping force detection" indicates the detected clamping force of the tie bar strain detector 141.

In this example, "clamping torque detection" is set in the item field 1919A, "25.00" is set in the maximum value field 1919B, and "−25.00" is set in the minimum value field 1714C. The "clamping torque detection" is indicated by the current value supplied to the clamping motor 160. The current value may be detected by a current detector or may be determined from a control command value for an inverter that supplies current to the clamping motor 160.

In this example, "Screw position detection" is set in the item field 1920A, "100.00" is set in the maximum value field 1920B, and "0.00" is set in the minimum value field 1920C. The "Screw position detection" indicates the position of the screw 330 detected by the injection motor encoder 351.

The waveform data field 1950 of FIG. 7 is a field for displaying waveform data indicating changes in the setting information or performance values indicated by the items set in each of the five channel fields (the 6th channel field 1916 to the 10th channel field 1920) in a waveform in the process "Mold closing process" set in the trigger (CH6-10) field 1941.

The waveform data 1951 in the waveform data field 1950 indicates a change in the detection result (an example of the performance value) of the "clamping position detection" set in the 6th channel field 1916. The waveform data 1952 indicates a change in the detection result (an example of the performance value) of the "clamping velocity detection" set in the 7th channel field 1917.

The waveform data 1953 indicates a change in a detection result (an example of a performance value) of the "clamping force detection" set in the 8th channel field 1918. The waveform data 1954 indicates a change in a detection result (an example of a performance value) of the "clamping torque detection" set in the 4th channel field 1714.

The waveform data 1955 indicates a change in a detection result (an example of a performance value) of the "screw position detection" set in the 10th channel field 1920.

The screen output part 734 starts rendering the waveform data of the process in the waveform data field 1950 on the condition that the detection part 732 detects that the process set in the trigger (CH6-10) field 1941 (for example, "mold closing process") has been reached.

In other words, in the present embodiment, when the display 760 displays multiple waveform data fields as a display screen, the display of the waveform data field corresponding to the process is started when the detection part 732 detects that the condition for starting the process corresponding to each of the waveform data fields is met. Therefore, when multiple waveform data fields are displayed, the timing at which waveform data starts to be displayed for each waveform data field is different.

If, after the waveform data in the first waveform data field corresponding to the first process is displayed, the processing of the first process is completed and the waveform data in the waveform data field corresponding to the second process is started, the screen output part 734 may continue to display the waveform data in the first waveform data field corresponding to the first process until processing within the same shot is completed. This allows the user to compare and confirm multiple waveform data.

According to the above-mentioned embodiments, by detecting whether or not the process has become the appropriate process based on the conditions set for the process, it is possible to properly ascertain the processing that took place in the process. This allows appropriate quality control.

Furthermore, for each waveform data field, when the conditions for the process set in the relevant waveform data field are met, the display of the waveform data for that process will begin. This allows the user to grasp the status of the process currently being performed on the current injection molding machine 10 in real time.

In the present embodiment, an example in which the process control manager 730 manages all processes of the injection molding machine 10 is described, but this configuration is not limited to the embodiment described above. For example, a process control manager may be provided to manage each process. Furthermore, a process control manager that manages one process may be combined with a process control manager that manages multiple related processes together. In other words, there may be one or more process control managers that manage the processes of the injection molding machine 10.

Although embodiments of the injection molding machine according to the present invention have been described above, the present invention is not limited to the above-described embodiments. Various modifications, corrections, substitutions, additions, deletions, and combinations are possible within the scope of the claims. They also naturally fall within the technical scope of the present invention.

The invention claimed is:

1. A controller of an injection molding machine comprising:
    at least one sensor configured to detect whether or not a process of a plurality of processes of an injection molding process performed in the injection molding machine has started based on preset conditions in the process; and
    a processor configured to output waveform information representing a change of a performance value detected in the process or a subsequent process that is subsequent to the process when the at least one sensor detects that the process has started,
    wherein, upon detecting, by the at least one sensor, that a first process among the plurality of processes has started, the processor saves first waveform information representing a change in an actual value detected at a first timing corresponding to the first process in a storage, or starts to display the first waveform information on a display, and
    wherein, upon detecting, by the at least one sensor, that a second process among the plurality of processes has started, the processor saves second waveform information representing a change in an actual value detected at a second timing corresponding to the second process in the storage, or starts to display the second waveform information on the display, said second timing being different from the first timing.

2. The controller of the injection molding machine according to claim 1, wherein the at least one sensor detects whether or not the process is started based on a combination of multiple conditions.

3. The controller of the injection molding machine according to claim 2, wherein the combination of multiple conditions includes one or more selected from a signal from a sensor provided in the injection molding machine, time from the start of a predetermined process, and communication information received from an external device.

4. The controller of the injection molding machine according to claim 1, wherein the processor outputs a screen indicating the waveform information of the process in a different area for each of a plurality of processes.

5. The controller of the injection molding machine according to claim 1, wherein the processor is further configured to keep on displaying the first waveform information on the display after the first process is completed and the second process starts until one cycle of the plurality of processes of the injection molding process is completed.

6. The controller of the injection molding machine according to claim 1 comprising:
the display configured to display the change of the performance value detected in the process when the at least one sensor detects that the process has started based on the preset conditions.

7. An injection molding machine comprising:
at least one sensor configured to detect whether or not a process of a plurality of processes of an injection molding process performed in the injection molding machine has started based on preset conditions in the process; and
a processor configured to output waveform information indicating a change of a performance value detected in the process or a subsequent process subsequent to the process when the at least one sensor detects that the process has started,
wherein, upon detecting, by the at least one sensor, that a first process among the plurality of processes has started, the processor saves first waveform information representing a change in an actual value detected at a first timing corresponding to the first process in a storage, or start to display the first waveform information on a display, and
wherein, upon detecting, by the at least one sensor, that a second process among the plurality of processes has started, the processor saves second waveform information representing a change in an actual value detected at a second timing corresponding to the second process in the storage, or starts to display the second waveform information on the display, said second timing being different from the first timing.

8. A non-transitory recording medium configured to record a program for a computer to execute a method, said method comprising:
detecting whether or not a process of a plurality of processes performed in an injection molding machine has started based on preset conditions in the process; and
outputting waveform information indicating a change of a performance value detected in the process or a subsequent process subsequent to the process when the program detects that the process has started,
wherein the method further comprising:
upon detecting, by the at least one sensor, that a first process among the plurality of processes has started, saving first waveform information representing a change in an actual value detected at a first timing corresponding to the first process in a storage, or starting to display the first waveform information on a display, and
upon detecting, by the at least one sensor, that a second process among the plurality of processes has started, saving second waveform information representing a change in an actual value detected at a second timing corresponding to the second process in the storage, or starting to display the second waveform information on the display, said second timing being different from the first timing.

* * * * *